United States Patent [19]

Laenens

[11] 4,381,466
[45] Apr. 26, 1983

[54] MAGNETIC CENTRAL ROTARY COUPLING

[75] Inventor: Werner Laenens, Berlin, Fed. Rep. of Germany

[73] Assignee: Siemens Aktiengesellschaft, Berlin and Munich, Fed. Rep. of Germany

[21] Appl. No.: 244,080

[22] Filed: Mar. 16, 1981

[30] Foreign Application Priority Data

Mar. 28, 1980 [DE] Fed. Rep. of Germany ....... 3012740

[51] Int. Cl.³ .............................................. H02K 49/06
[52] U.S. Cl. ..................................................... 310/103
[58] Field of Search .................... 310/92, 93, 103, 104

[56] References Cited

U.S. PATENT DOCUMENTS

| | | | |
|---|---|---|---|
| 2,432,234 | 12/1947 | Girard | 310/103 |
| 2,437,871 | 3/1948 | Wood | 310/103 |
| 3,936,683 | 2/1976 | Walker | 310/103 |
| 4,115,040 | 9/1978 | Knorr | 310/104 X |

Primary Examiner—Donovan F. Duggan
Attorney, Agent, or Firm—Kenyon & Kenyon

[57] ABSTRACT

The invention relates to a magnetic rotary coupling with outer magnetic devices on a rotary outer coupling member and an inner magnetic device on a rotary inner coupling member. The inner magnetic device includes permanent magnets spaced radially out from the axis, each such magnet having a magnetic axis perpendicular to a radius from the axis. The outer devices include permanent magnets having magnetic axes approximately radial with respect to the axis. Pole faces of the outer member are aligned with faces of opposite polarity of the inner member magnets to minimize the lengths of the flux loops linking the inner and outer magnets. A high-permeability shield bridges the outer poles of the outer member to reduce the total reluctance further, thereby maximizing the torque that can be transmitted between the inner and outer members.

6 Claims, 3 Drawing Figures

MAGNETIC CENTRAL ROTARY COUPLING

BACKGROUND OF THE INVENTION

The invention relates to a magnetic rotary coupling with an inner coupling member on which an inner magnetic device is located with an axis of magnetic symmetry transverse to the axis of rotation. The magnetic device comprises two pairs of magnetic poles, each pair defining a magnetic axis between them that is aligned at an angle to a radius from the axis of the coupling. The coupling also includes an outer coupling member on which a respective outer magnetic device is located symmetrically with respect to the inner magnetic device, the magnetic poles of the outer magnetic device being adjacent to those of the inner magnetic device and being aligned at an angle of about 30° to the axis of magnetic symmetry of the inner magnetic device.

In a known magnetic central rotary coupling (O. Richter, R. V. Voss, "Bauelemente der Feinmechanik" [Structural Elements of Precision Mechanics], 8th Edition, Verlag Technik, Berlin 1959, p. 330), the magnetic devices on the outer coupling member consist of a permanent magnet in the form of a circular segment, and the magnetic field lines of these permanent magnets emerge at the poles formed by pole pieces of these permanent magnets which project toward the inner coupling member. A magnetic device on the inner coupling member contains only one permanent magnet which is magnetized in the direction perpendicular to the axis of rotation and has pole pieces which are branched at their ends and each form a pair of magnetic poles. These magnetic poles are aligned at an angle to a radius from the axis of rotation of the magnetic device and are arranged symmetrically on both sides of this radius.

It is a disadvantage of this known central rotary coupling that the magnetic devices must contain relatively large and expensive permanent magnets, which of necessity also have considerable weight, to ensure that a sufficiently large torque can be transmitted. This leads to friction loss in the bearings of the rotary couplings. The fabrication of circular-segment permanent magnets of the outer magnetic devices with separate pole pieces, as well as the fabrication of the branch pole pieces of the inner magnetic device also increase the manufacturing costs.

OBJECTS AND SUMMARY OF THE INVENTION

It is an object of this invention to provide a magnetic central rotary coupling capable of transmitting a relatively large torque and yet having a low manufacturing cost.

A further object is to provide a rotary magnetic coupling with permanent magnets on the inner member having their magnetic axes perpendicular to radii from the axis and with permanent magnets on the outer member having radial magnetic axes located to minimize the flux path through the inner and outer magnets.

According to the invention, the magnetic devices in an inner member of a rotary coupling of the above-mentioned type, include two rod-shaped permanent magnets, magnetized transversely with respect to their longitudinal directions, which are parallel to the axis of rotation. The magnetic axis of each rod-shaped magnet in the inner magnetic device is perpendicular to radii extending from the axis of rotation. The outer member has magnetic devices that include two rod-shaped permanent magnets having longitudinal directions parallel to the axis. The latter magnets are magnetized to have magnetic axes perpendicular to their longitudinal directions and extending radially from the axis and angularly spaced to be close to the pole faces of the inner device to minimize the lengths of the magnetic flux loops.

The rotary coupling according to the invention has, among other things, the advantage that the magnetic devices consist of rod-shaped permanent magnets which all have the same shape and therefore can be produced in the same manner. In addition, the shape of the magnets is favorable for magnets suitable for such use, and because of their small dimensions, they require little space and can be mounted in a simple manner in the coupling members. The magnetic poles have no separate pole pieces to necessitate additional machining operations, and the magnetic devices have comparatively little weight. The minimization of the flux loop lengths further ensures that a large torque can be transmitted.

Especially advantageous in the rotary coupling according to the invention is an embodiment in which the rod-shaped permanent magnets of the inner magnetic device are placed so that their magnetic poles, having the same sign, are disposed on opposite sides of an axis of magnetic symmetry perpendicular to the axis of rotation of this magnetic device. This arrangement of the permanent magnets of the inner magnetic device ensures that a particularly large torque can be transmitted, since the rotary coupling arrives again in a stable position after it has slipped 180 degrees. The permanent magnets of the outer magnetic device are arranged so that in the stable positions of the rotary coupling, forces of attraction between the outer magnetic devices and the inner magnetic device are operative.

In another embodiment of the central rotary coupling according to the invention, magnetic poles having the same sign of the rod-shaped permanent magnets of the inner magnetic device are disposed on the same side of the axis of magnetic symmetry of this magnetic device. In this embodiment, a relatively rigid coupling is produced.

It is also preferable for the inner coupling member to be supported on a shaft that consists of a low permeability material. With such a shaft, undesirable flux line return via the shaft to the outer coupling member is prevented, thus resulting in an increase of the magnetic penetration between the coupling members in the vicinity of the magnetic devices and therefore to an increase of the torque that can be transmitted.

It is also preferable that a high-permeability return ring be provided around the outer coupling member to surround the rod-shaped permanent magnets of the outer magnetic devices. This return ring provides a low reluctance path for the magnetic field lines on the sides facing away from the inner coupling half, which also increases the magnetic penetration between the coupling members.

It is particularly desirable that the rod-shaped permanent magnets consist of a sintered material of cobalt and rare earths. Such permanent magnets exhibit extraordinarily high magnetic field strength relative to their volume, so that the central rotary coupling according to the invention can be constructed with relatively small dimensions and therefore with little weight of its own. Because of the small weight of the coupling members, the consequently small bearing forces can be taken up in some cases by the extraordinarily high field strength of the permanent magnets, which further improves the operating behavior of the rotary coupling.

DETAILED DESCRIPTION OF THE INVENTION

Figure 1:
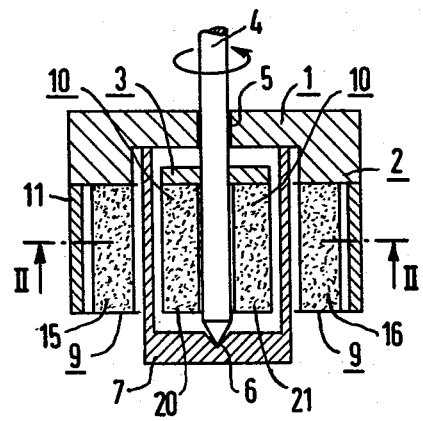
FIG. 1 is a schematic view of one embodiment of a rotary coupling according to the invention.
Figure 2:
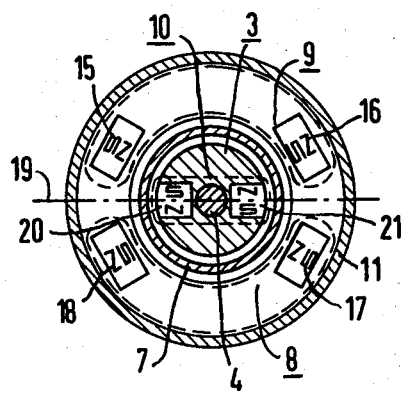
FIG. 2 is a cross section through the same embodiment along lines II—II.

FIGS. 1 and 2 show a magnetic rotary coupling 1 that comprises an outer coupling member 2 and an inner coupling member 3. The inner coupling member 3 is fastened on a shaft 4 which is supported by bearings 5 and 6. Between the inner and the outer coupling members is a cup-shaped separator 7 of low permeability material so as not to interfere with magnetic coupling between the inner and outer members. The outer coupling member 2 has outer magnetic devices 8 and 9; the inner coupling member 3 supports an inner magnetic device 10. The outer coupling member 2 further contains a high permeability return ring 11 surrounding the magnetic devices 8 and 9.

The outer magnetic devices 8 and 9 at the outer coupling member 2 contain rod-shaped permanent magnets 15–18, shown particularly in FIG. 2, where these permanent magnets are illustrated as being aligned at an angle of 30° to the axis of symmetry 19 of the inner magnetic device 10 and are jointly enclosed on the outside by the return ring 11. Thus, each of the two magnets 15 and 18 of the outer member 2 that couple to the same magnet 20 of the inner member have magnetic axes approximately 60° apart. The inner magnetic device 10 contains two rod-shaped permanent magnets 20 and 21 which are aligned at an angle of 90° to the axis 19 and the magnetic poles of which having the same sign lie on opposite sides of the axis 19. In the stable position of the rotary coupling 1, a closed field line path between the inner magnetic device 10 and the outer magnetic devices 8 and 9 is developed, since magnetic poles of different polarity are attracted to positions adjacent to each other.

Figure 3:
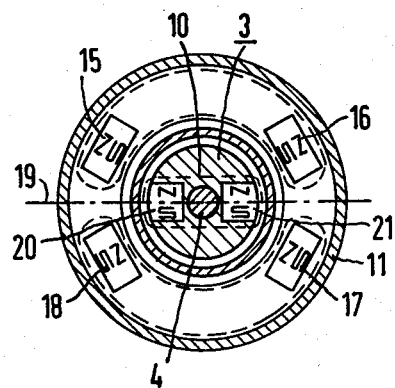
FIG. 3 is a cross section through another embodiment.

The embodiment according to FIG. 3 differs from that according to FIG. 2 in that magnetic poles having the same sign in the rod-shaped permanent magnets 20 and 21 are located on the same side of the axis 19. Also in this embodiment, the permanent magnets 15 to 18 of the outer magnetic devices 8 and 9 are arranged so that in the stable position of the central rotary coupling, magnet poles of opposite polarity are adjacent to each other and therefore, a closed field line path is developed.

A large torque can be transmitted, and therefore optimum operating behavior is ensured in the two embodiments due to the use of rod-shaped permanent magnets 15–18, 20 and 21 of a sintered material of cobalt and rare earths, and their arrangement in the coupling members 2 and 3.

What is claimed is:

1. Magnetic central rotary coupling with
   (a) an inner coupling half having disposed thereon an inner magnetic device with its longitudinal axis transverse to the axis of rotation, said inner magnetic device including two pairs of magnet poles, one pair at each longitudinal end thereof; and
   (b) an outer coupling half having first and second outer magnetic devices disposed thereon symmetrical to the longitudinal axis of the inner magnetic device, the magnet poles of said outer magnetic device adjacent to those of the inner magnetic device and aligned at an angle of approximately 30° to the longitudinal axis of the inner magnetic device, the improvement comprising said inner and first and second outer magnetic devices each containing two rod shaped permanent magnets, the rod shaped permanent magnets of the outer magnetic devices being situated at the locations of the magnet poles of said devices and the rod shaped permanent magnets of said inner magnetic device situated so that their magnet poles are aligned at an angle of 90° to the longitudinal axis.

2. A central rotary coupling according to claim 1 wherein magnet poles of the rod shaped permanent magnets of the inner magnetic device having the same polarity are situated on different sides of the longitudinal axis of said inner magnetic device.

3. A central rotary coupling according to claim 1 wherein magnet poles of the rod shaped permanent magnets of the inner magnetic device having the same polarity are situated on the same sides of the longitudinal axis of said magnetic device.

4. A central rotary coupling according to one of claims 1, 2 or 3 and further comprising a shaft supporting said inner coupling half consisting of a magnetically non-conductive material.

5. A central rotary coupling according to one of claims 1, 2 or 3 and further comprising a magnetically conducting return ring arranged at the outer coupling half, said ring surrounding said rod shaped permanent magnets of said outer magnetic devices on the outside.

6. A central rotary coupling according to one of claims 1, 2 or 3 wherein said rod shaped permanent magnet consists of a sintered material of cobalt and rare earths.

* * * * *